June 18, 1963  R. J. MARING  3,094,184
VARIABLE SYSTEM DAMPING
Filed April 14, 1959  5 Sheets-Sheet 1
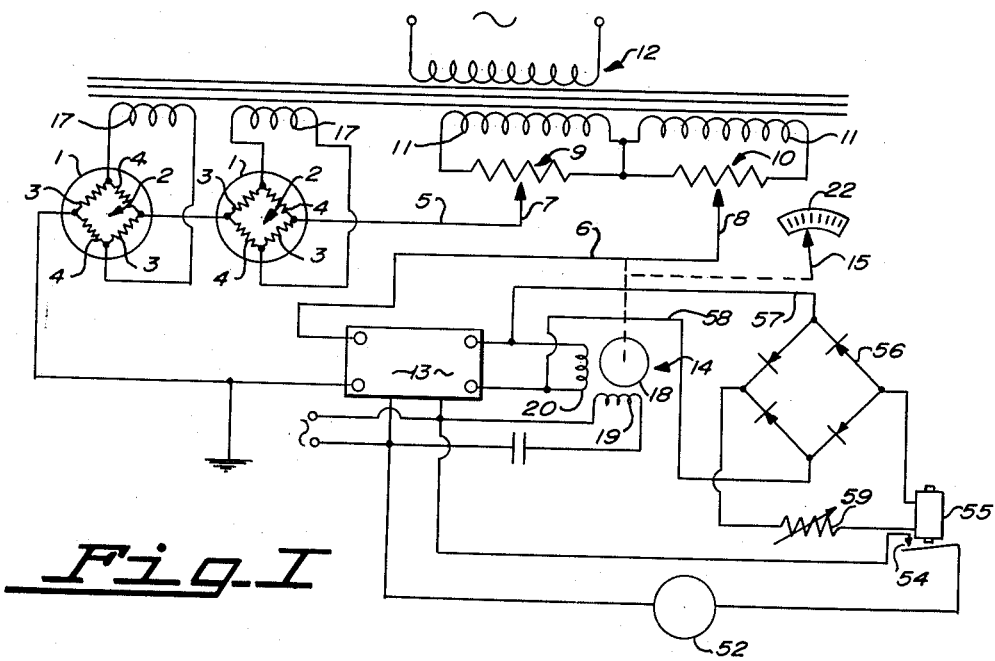
Fig. I
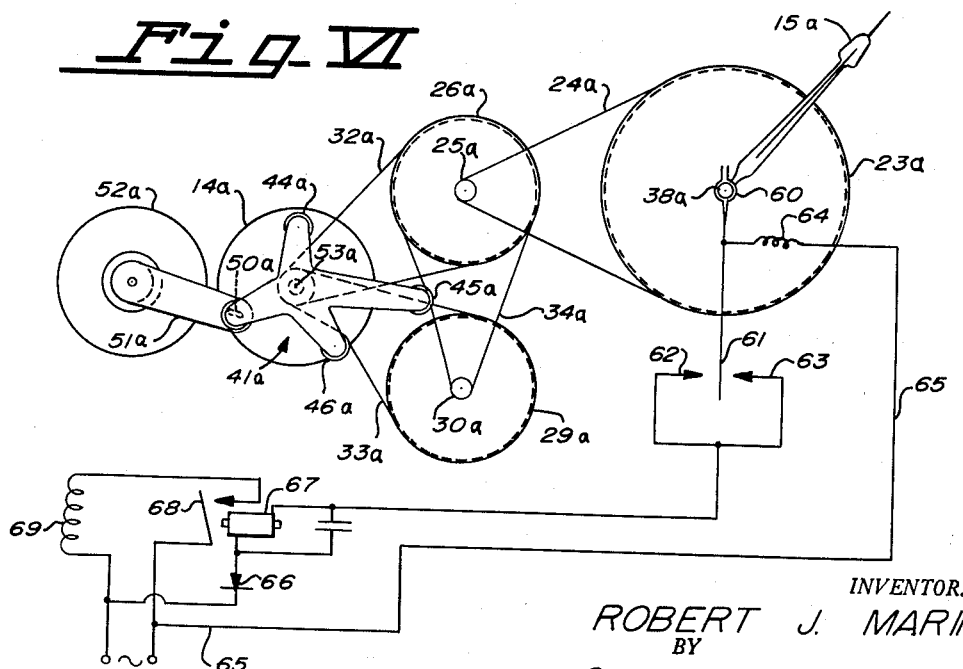
Fig. VI
INVENTOR.
ROBERT J. MARING
BY
Marshall, Marshall & Yeasting
ATTORNEYS

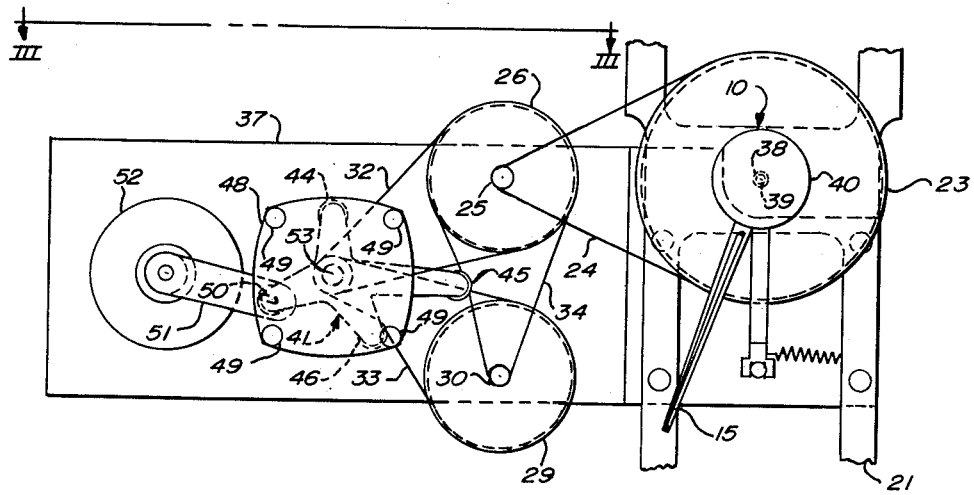
Fig. II
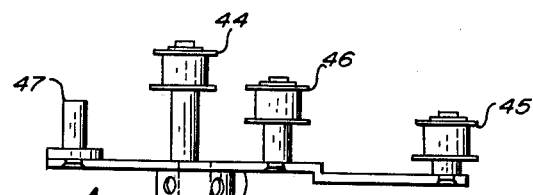
Fig. IV
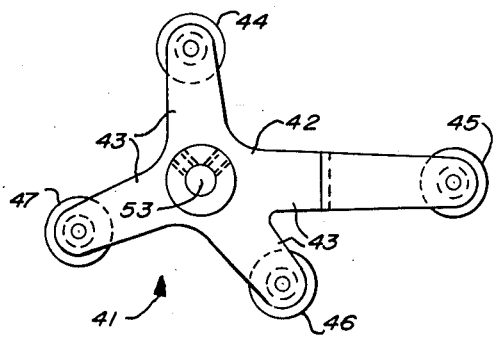
Fig. V
INVENTOR.
ROBERT J. MARING

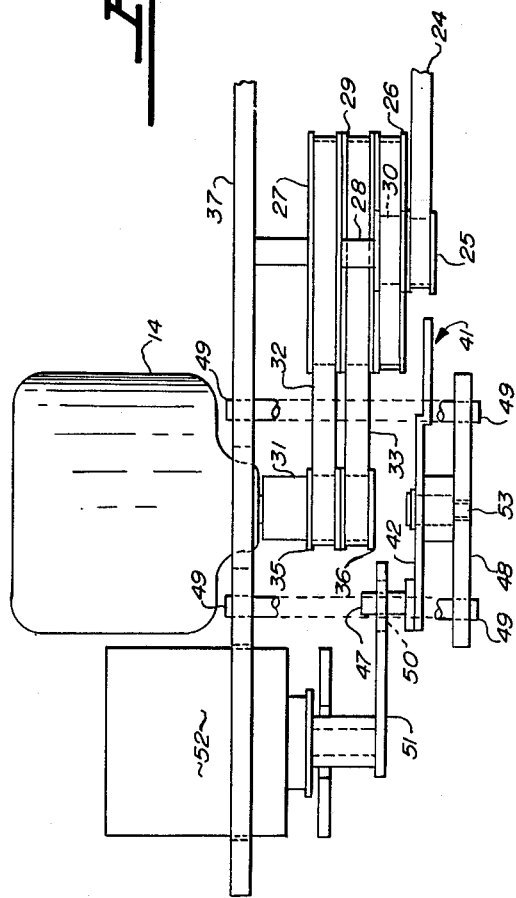

June 18, 1963  R. J. MARING  3,094,184
VARIABLE SYSTEM DAMPING
Filed April 14, 1959  5 Sheets-Sheet 4
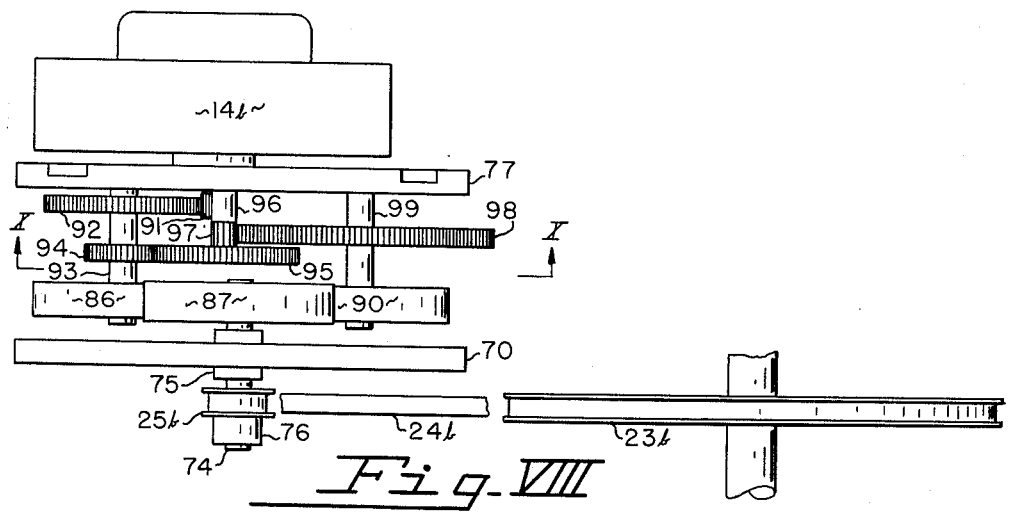
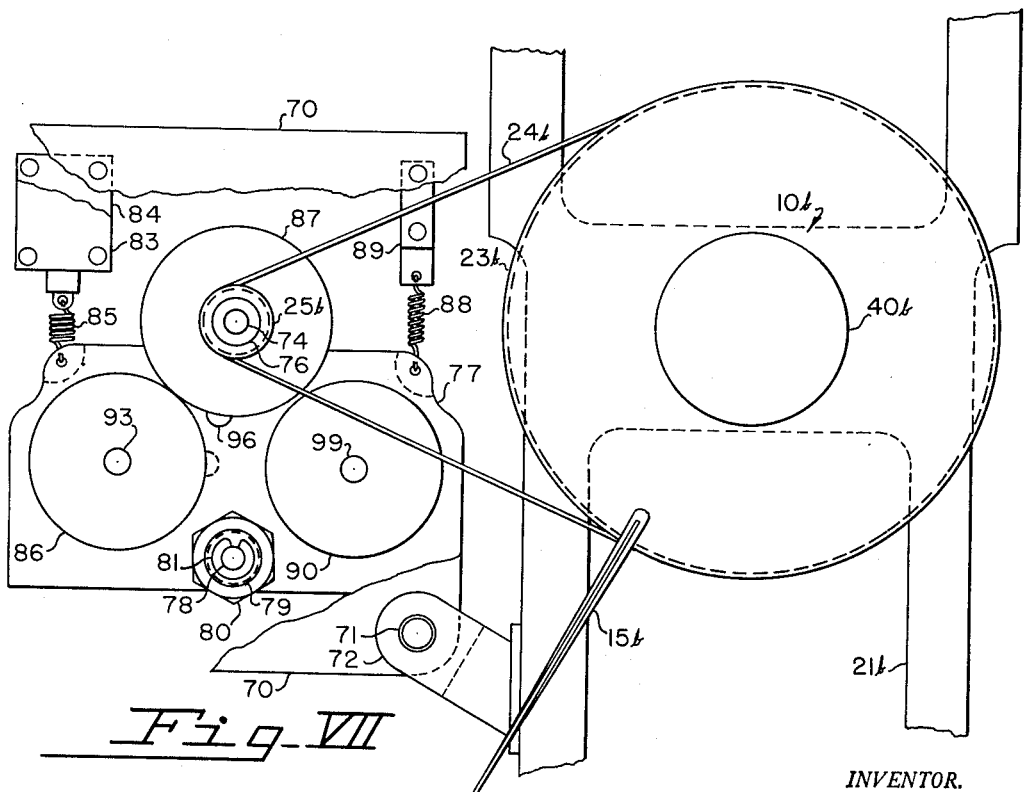
INVENTOR.
ROBERT J. MARING
BY
Marshall, Marshall and Yeasting
ATTORNEYS

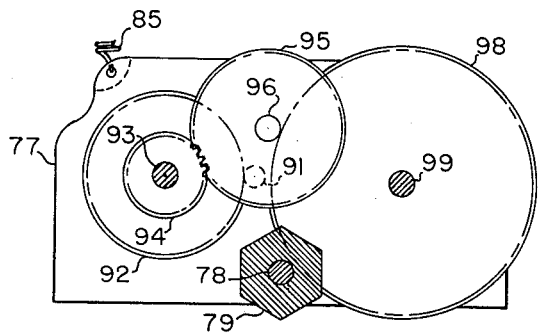
_Fig-X_
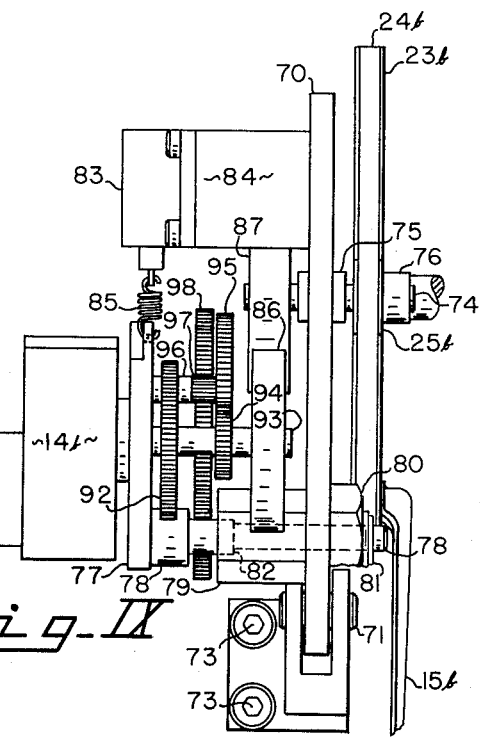
_Fig-IX_
INVENTOR.
ROBERT J. MARING
BY
Marshall, Marshall and Yeasting
ATTORNEYS United States Patent Office 3,094,184
Patented June 18, 1963

3,094,184
VARIABLE SYSTEM DAMPING
Robert J. Maring, Toledo, Ohio, assignor to Toledo Scale Corporation, Toledo, Ohio, a corporation of Ohio
Filed Apr. 14, 1959, Ser. No. 806,394
12 Claims. (Cl. 177—211)

This invention relates to instruments of the servo type for measuring variables, such as automatic weighing scales, and in particular to damping means for reducing the speed of response of such an instrument on arrival at a particular point in its measuring cycle such as, in the case of an automatic weighing scale, on arrival of condition at near balance.

The damping means is especially suitable for use with a weighing scale of the electrical or electronic type wherein a transducer such as a strain gage load cell or a linear differential transformer or a potentiometer produces an output error voltage which is a function of load applied to the weighing scale and a continuously automatically adjustable voltage source supplies a second voltage in opposition to the error voltage and is operated by servo means in response to differences between the voltages. However, the damping means also is suitable for use with any instrument of the servo type for measuring variables such as pressure and temperature recorders and indicators in which it is desired to have a servo system operate at one of several speeds depending upon a particular condition. Other variables which might be sensed by the transducers of measuring instruments of the servo type in addition to weight, pressure, and temperature are height, position, etc.

The damping means is especially useful in connection with the foregoing weighing scales for preventing the indicating of erroneous weights of erratically moving loads. In weighing live or moving loads, e.g., living animals, it is desirable to arrive at a weight balance quickly, that is, to arrive at a weight indication quickly, but when balance has been reached, to reject from the weight indication any indications which are attributable to the movement of the load. Such undesired indications which are attributable to the movement of the load may be referred to as acceleration indications and such moving loads may be referred to as acceleration loads. Thus, the weighing scale should have a high speed of response to a dead weight and to have a slow speed of response to the acceleration loads which, of course, are random in nature. While the weighing scale is coming to balance with a load upon the scale, the speed of response should be high but when appropriate balance is attained, the random acceleration loads should be rejected by reducing the speed of response of the apparatus by suitable damping means.

The principal object of this invention is to provide instruments of the servo type for measuring variables with damping means for automatically changing their speed of response on arrival at a particular point in their measuring cycles.

Another object of this invention is to provide a multiple speed servo system.

Still another object is to provide an electronic or electrical weighing scale for indicating the true weight of a load moving erratically on the scale.

A further object is to provide, in an electronic or electrical weighing scale having load indicating mechanism which normally has a high speed of response to dead weight, damping means for changing such high speed of response on arrival of condition at near balance.

Other objects and more specific objects and advantages are apparent from the following description of preferred forms of the invention.

According to the invention, a multiple speed servo system is provided for instruments of the servo type which measure variables such as weight, pressure, temperature, height, and position. At particular points in the measuring cycles, the servo system automatically changes speed to change the speed of response of the instruments. For example, in the case of automatic electrical or electronic weighing scales, the servo system drives load indicating mechanism which has an indicator which ordinarily oscillates about the balance point in response to erratically moving loads, such as living animals. At arrival of condition at near balance, the servo drive automatically reduces its speed to reject random acceleration loads, whereby the weighing scale indicates the true weight of the load moving erratically thereupon. While the loaded weighing scale is coming to balance, the speed of response is high, but when appropriate balance is attained, the random accelerations are rejected by reducing the speed of response of the indicating mechanism to the point where movements of any of the indicator are so minute that they are not significant.

Preferred embodiments of the invention are illustrated in the accompanying drawings. In the drawings:

FIG. I is a schematic wiring diagram showing the essential components of an electronic weighing scale;

FIG. II is a fragmentary elevational view of load indicating mechanism and the drive therefor of the weighing scale;

FIG. III is a plan view as seen from the line III—III of FIG. II looking in the direction indicated by the arrows;

FIG. IV is an enlarged and detailed plan view of a tensioning arm assembly which also is illustrated in FIG. II;

FIG. V is an elevational view of the tensioning arm assembly which is illustrated in FIG. IV;

FIG. VI is a view of a damping means similar to the one illustrated in FIG. II combined with a schematic wiring diagram of modified automatic control means;

FIG. VII is a fragmentary elevational view of load indicating mechanism, the view being generally similar to FIG. II, of a modified drive for the indicating mechanism;

FIG. VIII is a plan view of the mechanism shown in FIG. VII;

FIG. IX is an end elevational view as seen from a position to the left of the mechanism as shown in FIG. VII; and FIG. X is a horizontal sectional view taken along the line X—X of FIG. VIII.

These specific figures and the accompanying description are intended to merely illustrate the invention and not to impose limitations on the claims.

Referring to FIG. I, an electronic weighing scale embodying the invention includes a pair of load cells 1 connected in series and each comprising a resistance wire strain gage bridge 2. Each of the bridges 2 has resistance elements 3 in two of its legs and resistance elements 4 in the other two legs. The bridges 2 are of an ordinary type used in gages available for measuring strain wherein the elements 3 and 4 are adapted to change in resistance with changes in a condition to be measured, e.g., load applied to the load cells 1.

In order that the point from which the measurements are made may be adjusted and that measurements of the values from such point may be obtained, there are provided conductors 5 and 6 from the output terminals of the series-connected bridges 2 to sliding contacts 7 and 8 of potentiometers 9 and 10, respectively, connected together and energized from secondary windings 11 of a transformer 12. An amplifier and motor control device 13 is connected in circuit with the conductor 6 and controls the operation of a servomotor 14 which both positions an indicator 15 for indicating the output voltage of the bridge network in terms of weight and the sliding contact 8 through a belt drive which is indicated by broken lines. The sliding contact 7 is adapted to be positioned manually. Secondary windings 17 of the transformer 12 are connected to the bridges 2 for energizing the latter.

The servomotor 14 is shown in FIG. I as a reversible, two-phase motor having a rotor 18 connected to the sliding contact 8 and to the indicator 15 to position them. The servomotor 14 includes a reference winding 19 connected to a suitable source of alternating current and a control winding 20. By changing the phase of the voltage supplied to the control winding 20 with respect to the phase of the reference voltage in the reference winding 19, the direction of the servomotor 14 will be reversed as is understood in the art.

The series-connected bridges 2 form a balanceable network that is adapted to be unbalanced in response to changes in load applied to the load cells 1, i.e., the network develops an output voltage between the conductors 5 and 6 which is a function of load applied to the load cells. This output voltage opposes the output voltage of the potentiometers 9 and 10, the potentiometer 10 driven by the servomotor 14 serving as a continuously automatically adjustable voltage source. The output voltage of the bridge network opposes the output voltage of the potentiometer circuit connected thereto to determine the flow of current through the amplifier and motor control device 13. An unbalance of the output voltages results in operation of the servomotor 14 to position the indicator 15 and the contact 8 until the opposing voltages are equal, whereby input voltage to the amplifier 13 is restored to null. An adjustment of the contact 7 results in a change in the positions of contact 8 to produce a balance for predetermined conditions to be measured. The positions of contact 8 are representative of the conditions measured, and a changing of these positions by manual adjustment of contact 7 merely results in an indication of the values from a different zero point. Any suitable transducer such as a linear differential transformer or a potentiometer can be substituted for the strain gage transducer which has been described. The only requirement is that a means be provided that will sense the size of the variable being measured by producing an electrical error signal which is a function of the variable, the error signal being opposed and finally balanced by voltage from the continuously automatically adjustable voltage source.

Referring to FIGS. II and III, the indicator 15 is mounted for rotation in an upstanding frame 21. The weight of any load within the capacity of the scale that is placed upon the load cells 1 is indicated by the indicator 15 on an ordinary indicia bearing chart 22 which is shown in FIG. I. The indicator 15 is fixed to a sheave 23 which is turned by a drive that includes a belt 24 driven by a pulley 25 that is fixed to the side of a sheave 26, the pulley 25 and the sheave 26 turning about the same axis. The pulley 25 and the sheave 26 also are fixed to another sheave 27 (FIG. III) by means of a spacer 28 which sheave 27 also has the same axis of rotation as the pulley 25 and the sheave 26, the pulley 25, the sheave 26 and the sheave 27 turning as one. Immediately below the space provided by the spacer 28, so that it may be seen in full lines in FIG. III, is a sheave 29 mounted together with a pulley 30 for rotation, the sheave 29 and the pulley 30 having the same axis of rotation and turning as one. The sheave 29 and the pulley 30 also can be seen in FIG. II.

The sheave 27 is connected to the drive shaft 31 of the servomotor 14 by means of a normally loose belt 32, the sheave 29 is connected to the drive shaft 31 by means of a normally loose belt 33, and the sheaves 26 and 29 are interconnected by means of a normally loose belt 34. The belt 32 runs around a pulley 35 on the drive shaft 31 and around the sheave 27, the belt 33 runs around a second pulley 36 on the drive shaft 31 and around the sheave 29, and the belt 34 runs around the sheave 26 and around the pulley 30 which is fixed to the sheave 29, thus, interconnecting the sheaves 26 and 29. Means, hereinafter described, are provided for automatically tightening either the normally loose belt 32 or the normally loose belts 33 and 34 so that the speed ratio of the belt drive may be changed.

When the belt 32 is tight, the indicator 15 is driven by the drive shaft 31 of the servomotor 14 through the belt 32 which turns the sheave 27 and its attached sheave 26 and pulley 25 and through the belt 24. When the belt 32 is tight, the belts 33 and 34 are loose and merely slip around their associated pulleys and sheaves inoperatively. When the belts 33 and 34 are tight, the indicator 15 is driven by the drive shaft 31 of the servomotor 14 through the belt 33 which turns the sheave 29 and its attached pulley 30, through the belt 34 which interconnects the sheaves 26 and 29, and through the belt 24. When the belts 33 and 34 are tight, the belt 32 is loose and merely slips around its associated pulley and sheave inoperatively.

The servomotor 14 and the various pulleys and sheaves are mounted on a vertical supporting plate 37 secured to the upstanding frame 21. When an unbalance of output voltages results in operation of the servomotor 14 to position the contact 8 of the potentiometer 10, it is of course necessary that the indicator 15 be driven by the servomotor to exactly the corresponding point on the chart 22. For this reason, the servomotor 14 is drivingly connected to a shaft 38 (FIG. II), upon which the indicator 15 is mounted, and to a potentiometer shaft 39, which positions the contact 8, by means of the sheave 23 that is a common drive means for both of the shafts, the shafts being axially aligned and rigidly coupled so that they turn as one. As may be seen in FIG. II, the entire potentiometer structure 10 including its case 40 is supported adjacent to the indicator 15.

The means for automatically tightening the belts includes a solenoid operated tensioning arm assembly 41 comprising an arm 42 having four fingers 43 three of which carry rollers 44, 45 and 46 and one of which carries a drive member 47. The rollers 44, 45 and 46 have been removed from the arm 42 as shown in FIG. III for clarity of illustration. However, the rollers 44, 45 and 46 may be seen in FIGS. II, IV and V. As shown in FIGS. II and III, the tensioning arm assembly 41 is mounted for rotation on a plate 48 carried in spaced apart relationship from the vertical supporting plate 37 by means of four spacer rods 49. The drive member 47 on the arm 42 cooperates with a slot 50 in a drive link 51 which is rocked by a rotary solenoid 52 that also is carried by the supporting plate 37. The rotary solenoid 52 is of the ordinary type wherein an armature shaft is turned through an angle of 40 to 50 degrees when the solenoid is energized and is rocked by a return spring to its initial position when the solenoid is deenergized. Rocking of the drive link 51 by the solenoid 52 pivots the tensioning arm assembly 41 about its pivot point 53, the drive member 47 sliding from one end of the slot 50 to the other when the drive link 51 is operated.

In the high ratio or slow speed drive position of the tensioning arm assembly 41 which position is illustrated in FIG. II, the roller 44 is out of contact with the normally loose belt 32, the roller 45 is pressed against the normally loose belt 34 so that it is tensioned and the roller 46 is pressed against the normally loose belt 33 so that it also is tensioned. The normally loose belt 32 merely slips around its associated pulley and sheave inoperatively and the drive from the servomotor 14 to the indicator 15 is through the belts 33, 34 and 24. The speed ratio between the drive shaft 31 of the servomotor 14 and the sheave 29 is 6:1, the speed ratio between the pulley 30 and the sheave 26 is 6:1, and the speed ratio between the pulley 25 and the sheave 23 is 10:1. Therefore, when the tensioning arm assembly 41 is positioned as shown in FIG. II, the speed ratio between the drive shaft 31 of the servomotor 14 and the sheave 23, which turns the indicator 15, is 360:1, i.e., 6 times 6 times 10.

In the other position of the tensioning arm assembly 41, i.e., the low ratio or high speed drive position, the tensioning arm assembly 41 is rocked clockwise from the position shown in FIG. II so that the roller 44 is pressed against the normally loose belt 32 so that it is tensioned and the rollers 45 and 46 are out of contact with their associated belts. The normally loose belts 33 and 34 merely slip around their associated pulleys and sheaves inoperatively and the drive from the servomotor 14 to the indicator 15 is through the belts 32 and 24. The speed ratio between the drive shaft 31 of the servomotor 14 and the sheave 27 is 6:1 and, as hereinbefore mentioned, the speed ratio between the pulley 25 and the sheave 23 is 10:1. Therefore, the speed ratio between the drive shaft 31 of the servomotor 14 and the sheave 23 which turns the indicator 15 is 60:1, i.e., 6 times 10. Hence, in the high ratio or slow speed drive position of the tensioning arm assembly 41, i.e., the position shown in FIG. II, when the drive shaft 31 of the servomotor turns 360 times, the sheave 23 turns once and in the low ratio or high speed drive position, when the drive shaft 31 turns 60 times, the sheave 23 turns once. Means, hereinafter described, are provided for automatically changing the speed ratio of the belt drive from 60:1 to 360:1 or vice versa in response to arrival of condition at near balance of the opposing output voltages of the balanceable bridge network and the potentiometers 9 and 10.

In weighing live or moving loads, e.g., living animals, it is desirable to arrive at a weight balance quickly, that is, to arrive at a weight indication quickly by using the low 60:1 ratio (high speed), but when balance has been reached, to reject from the weight indication any indications which are attributable to the movement of the load by using the high 360:1 ratio (slow speed). Thus, the weighing scale normally has a high speed of response to a dead weight, i.e., a normally high speed of response to unbalance of the balanceable bridge network, and a slow speed of response to random acceleration loads. While the weighing scale is coming to balance with a load upon the load cells 1, the speed of response is high, but when appropriate balance is attained, the random accelerations are rejected by reducing the speed of response of the indicating mechanism to the point where movements if any of the indicator 15 are so minute that they are not significant. The belt drive and the means for changing its speed ratio prevents the indicating, or the printing if the device is employed in a printing scale, of erroneous weights of erratically moving loads.

The coil of the rotary solenoid 52 is energized from a suitable source, as indicated in FIG. I, when the normally open contacts 54 of a sensitive null detecting relay 55 are closed. The relay 55 is connected across a full wave rectifier 56 which is connected in turn to the amplifier 13 by means of conductors 57 and 58. Output voltage from the amplifier 13 above a predetermined fixed value, as adjusted by a variable resistor or voltage regulator 59, causes the coil of the sensitive relay to be energized. However, when the signal drops below such fixed value or amplitude the null detecting relay becomes deenergized and the normally open contacts 54 open cutting off the flow of current to the rotary solenoid 52. The fixed value may be set, for example, so that the coil of the sensitive relay 55 becomes deenergized when about 75% of the output voltage of the bridge network is counterbalanced by opposing voltage from the potentiometers 9 and 10.

In operation, load upon the load cells 1 causes the bridge network to develop an output voltage between the conductors 5 and 6 of such an amplitude that the output voltage from the amplifier 13 causes the coil of the sensitive relay 55 to be energized. Energization of the coil of the relay causes the normally open contacts 54 to close and current flows through the coil of the rotary solenoid 52. This causes the armature of the solenoid to be turned through an angle of 40 to 50 degrees rocking the drive link 51 which pivots the tensioning arm assembly 41 clockwise as viewed in FIG. II from its position shown in FIG. II into a position such that the roller 44 contacts and tensions the belt 32 and the rollers 45 and 46 inoperatively are out of contact with their associated belts. The belt drive is then in low 60:1 ratio, i.e., in high speed drive. The indicator 15 and the sliding contact 8 of the potentiometer 10 are driven through the high speed belt drive by the servomotor 14 so that the indicating mechanism normally has a high speed of response to unbalance of the balanceable bridge network. When the amplitude of the unbalanced voltage drops below a predetermined fixed value upon arrival of condition at near balance of the opposing voltages, i.e., the output voltage of the network and the output voltage of the potentiometer circuit, the coil of the sensitive null detecting relay 55 becomes deenergized and its contacts 54 open. This causes the coil of the rotary solenoid 52 to be deenergized and the return spring of the solenoid returns the armature of the solenoid to its initial position which causes the tensioning arm assembly 41 to be pivoted counterclockwise about its pivot point 53 to its position shown in FIG. II. In such position, the belt drive is in high 360:1 ratio, i.e., in low speed drive, to reject random acceleration loads, i.e., the speed of response of the indicating mechanism is so low that, when appropriate balance is attained, movements if any of the indicator 15 are not significant and the correct dead weight of an erratically moving load is indicated.

When the load is removed from the scale, the bridge network again is unbalanced until the servomotor 14 returns the sliding contact 8 to its zero position. Unbalance of the network causes the sensitive relay 55 to be reenergized to close its contacts 54. Closing of the contacts 54 permits the rotary solenoid 52 to be energized automatically shifting the belt drive into high speed drive to rapidly return the indicator 15 toward its zero position.

A modification of the control circuit (FIG. I) for the rotary solenoid 52 is shown in FIG. VI. Reference numerals in FIG. VI which are similar to those in FIGS. I–V identify parts which are similar in structure and in function. The structure and function of the damping means, i.e., the belt drive, rotary solenoid and tensioning arm assembly, shown in the modified apparatus are exactly the same as the structure and function of the damping means hereinbefore described, however, whereas the damping means shown in FIGS. I–V operates automatically in response to change in amplitude of an unbalanced voltage the damping means shown in FIG. VI operates automatically in response to reversal of direction of the servomotor.

The modified control circuit (FIG. VI) includes a clip 60 which is held by friction on an indicator shaft 38a that has fixed thereon an indicator 15a, the clip 60 and the indicator 15a turning as one except when a circuit closing extension 61 of the clip is against one or the other of contacts 62 and 63. A flexible connection 64 between the extension 61 of the friction clip 60 and a conductor 65 permits limited movement of the extension.

When load is placed upon the load cells 1, a servomotor 14a rotates the indicator shaft 38a through the belt drive clockwise as viewed in FIG. VI. The indicator 15a and the friction clip 60 turn as one until the circuit-closing extension 61 of the clip touches the contact 62. This completes a circuit from a suitable source of alternating current through a rectifier 66, the coil of a relay 67 to the now closed contact 62 and through the conductor 65 to the other side of the line. Energization of the relay 67 closes its normally open contacts 68 which permits current to flow from the source of alternating current through a coil 69 of a rotary solenoid 52a. Energization of the solenoid 52a shifts the belt drive into high speed, i.e., the drive from the servomotor 14a to the indicator 15a is through belts 32a and 24a, and the indicator 15a is driven rapidly to full weight indication, the friction clip 60 slipping on the shaft 38a from the time the extension 61 of the clip touches the contact 62 until the indicator 15a reaches full weight indication. Random acceleration loads are rejected by reducing the speed of response of the indicating mechanism.

Reduction in the speed of response of the indicating mechanism is accomplished automatically in response to reversal of direction of the servomotor 14a, i.e., in response to arrival of condition at near balance of the opposing voltages. While the weighing scale is coming to balance with a load upon the scale, the speed of response is high but when approximate balance is attained, an erratically moving load causes reversal of the servomotor 14a. Reversal of the servomotor 14a changes the direction of rotation of the indicator 15a to movement in a counterclockwise direction which causes the extension 61 of the friction clip 60 to back away from the contact 62. This breaks the flow of current to the coil of the relay 67. Deenergization of the relay 67 permits its normally open contacts 68 to open cutting off the flow of current to the coil 69 of the solenoid 52a. This shifts the belt drive into slow speed, i.e., the drive from the servomotor 14a to the indicator 15a is through the belts 33a, 34a and 24a, to reject random acceleration loads, i.e., when approximate balance is attained, movements of the indicator shaft 38a due to erratically moving loads keep the extension 61 of the friction clip 60 oscillating back and forth between the contacts 62 and 63 to shift the belt drive automatically back and forth from high speed to low speed and vice versa which effectively dampens the system. The speed of response of the indicating mechanism is so slow, because of the opening of the contacts 62 and 63, that movements if any of the indicator 15a are not significant.

When the load is removed from the scale, the bridge network again is unbalanced to reverse the servomotor 14a. Reversal of the servomotor causes the indicator 15a to be driven in a counterclockwise direction and the extension 61 of the friction clip 60 to be moved against the contact 63. Current then flows through the coil of the relay 67 again closing its contacts 68 which permits current to flow through the coil 69 of the solenoid 52a shifting the belt drive into high speed to rapidly return the indicator 15a toward its zero position.

A modification of the drive for the slider 8 of the potentiometer 10 and for the indicator 15 is shown in FIGS. VII–X. Reference numerals in FIGS. VII–X which are similar to those in FIGS. I–VI identify parts which are similar in structure and in function. The modified drive shown in FIGS. VII–X produces the same results as the drive shown in FIGS. I–VI; however, it has been found to be more rugged because of the substitution of gears for all of the belts except one and because of the general design arrangement of its working parts.

The modified drive is mounted on a plate 70 which is pivotally mounted by means of a pin 71 in a bifurcated bracket 72 that is attached at 73 to the frame 21b of the weighing scale. The pulley 25b is secured to a shaft 74 journaled in bearings 75 in the plate 70, a hub 76 of the pulley 25b retaining the pulley 25b on the shaft. For the purpose of understanding the operation of the drive, the plate 70 can be considered as a stationary plate upon which the drive is mounted, the plate 70 being pivotally mounted merely to cause tightening of the belt 24b by the tendency of the plate 70 and everything supported thereby to pivot in a counterclockwise direction as viewed in FIG. VII about the axis of the pin 71 under the influence of gravity to hold the belt 24b tight. The belt 24b drives the slider of the potentiometer 10b and the indicator 15b in the same way as the slider 10 and the indicator 15 shown in FIG. I are driven with corresponding results, i.e., the circuit of FIG. I should be considered in connection with the servo drive mechanism of FIGS. VII–X.

A gear plate 77 is pivotally mounted on the relatively large plate 70 by means of a stud 78 that is fixed to the plate 77 and that is received in a bearing 99 secured to the plate 70, the bearing 79 having a shoulder against the left side of the plate 70 as viewed in FIG. IX and a threaded part which extends through the plate 70 on which a nut 80 is turned to hold the bearing 79 tight on the plate 70. Axial movement to the left of the stud 78 as viewed in FIG. IX is limited by means of a clip 81 on the stud and axial movement to the right of the stud 78 is limited by a shoulder 82 on the stud that is received in a mating countersunk portion of the bearing 79.

The gear plate 77 is pivoted in a clockwise direction about the axis of the stud 78 by means of a solenoid 83 which is carried by a bracket 84 that is secured to the plate 70, the solenoid 83 being connected to the top of the gear plate 77 by means of a spring 85. The solenoid 83 is substituted for the solenoid 52 in the circuit shown in FIG. I, the end functions of the solenoids being exactly the same i.e., each is a part of a two-speed servo system; the solenoid 52, however, is a rotary solenoid having an armature shaft which is rotated as hereinbefore described whereas the armature shaft of the solenoid 83 moves axially. Energization of the solenoid 83 causes its armature shaft to move upwardly lifting the gear plate 77 and pivoting it about the axis of the stud 78 within limits determined by contact of a high speed driving friction wheel 86 with a driven friction wheel 87. This is the position shown in FIG. VII. Deenergization of the solenoid 83 permits a return spring 88, connected to the top of the gear plate 77 and connected by means of a bracket 89 to the plate 70, to pivot the gear plate 77 in a countreclockwise direction about the axis of the stud 78 as viewed in FIG. VII within limits determined by contact of a low speed driving friction wheel 90 with the driven friction wheel 87. The spring 85 on the solenoid 83 is stronger than the return spring 88 so that the spring 85 can overcome the return spring 88 when the coil of the solenoid is energized and is used to connect the solenoid to the gear plate so that, after the high speed friction wheel 86 contacts the driven friction wheel 87, the armature shaft of the solenoid, if it has not completed its full upward travel, can by stretching the spring 85, complete such travel. This makes the solenoid 83 last longer, since improper seating of its armature shaft causes the solenoid to burn out.

A servomotor 14b is carried by the gear plate 77; its shaft carries a pinion 91 (FIG. VIII) which is meshed with a gear 92 on a shaft 93 that is journaled in the gear plate 77. A second gear 94 on the shaft 93 turns as one with the gear 92 as does also the high speed friction wheel 86 that is secured to the shaft 93. The second gear 94 on the shaft 93 meshes with and drives a gear 95 on a shaft 96 journaled in the gear plate 77, there being a pinion 97 on the shaft 96 juxtaposed to the gear 95 and turning as one therewith. The pinion 97 meshes with and drives a gear 98 on a shaft 99 journaled in the gear plate 77, the low speed friction wheel 90 also being on the shaft 99 and turning as one with the gear 98. Driven friction wheel 87 is fixed on the shaft 74 and drives the pulley 25b which also is fixed on the shaft 74. All of the gears are always in mesh, since they pivot as a unit assembly with the gear plate 77.

The speed ratio between gear 94 and gear 95 is 2:1 and the speed ratio between pinion 97 and gear 98 is 10:1; therefore, the speed ratio between the high speed friction wheel 86 which turns as one with gear 94 and the low speed friction wheel 90 which turns as one with gear 98 is 20:1, i.e., 2 times 10. Hence, friction wheel 86 which turns twenty times every time friction wheel 90 turns once is the high speed driving wheel and friction wheel 90 is the low speed driving wheel.

In weighing moving loads, it is desirable to arrive at a weight balance quickly, that is, to arrive at a weight indication quickly by using the high speed drive, but when balance has been reached, to reject from the weight indication any indications which are attributable to the movement of the load by using the low speed drive. Thus, the weighing scale normally has a high speed of response to a dead weight, i.e., a normally-speed of response to unbalance of the balanceable bridge network, and a slow speed of response to random acceleration loads. While the weighing scale is coming to balance with a load upon the load cells 1, the speed of response is high, but when appropriate balance is attained, the random accelerations are rejected by reducing the speed of response of the indicating mechanism to the point where movements if any of the indicator 15b are so minute that they are not significant. The gearing, the friction wheels and their pivotal mounting is essentially a damping device to prevent the indicating, or the printing if the damping device is employed in a printing scale, of erroneous weights of erratically moving loads.

In operation, load upon the load cells 1 causes the bridge network to develop an output voltage between the conductors 5 and 6 of such an amplitude that the output voltage from the amplifier 13 causes the coil of the sensitive relay 55 to be energized. Energization of the coil of the relay causes the normally open contacts 54 to close and current flows through the coil of the solenoid 83 (FIGS. VII and IX). This causes the armature of the solenoid to move upwardly pivoting the gear plate 77 about the axis of the stud 78 clockwise as viewed in FIG. VII into a position such that high speed friction wheel 86 contacts and drives friction wheel 87. This is the position shown in FIG. VII, the drive being in high speed. The indicator 15b and the sliding contact of the potentiometer 10b are driven through the high speed drive by the servomotor 14b so that the indicating mechanism normally has a high speed of response to unbalance of the balanceable bridge network.

When the amplitude of the unbalanced voltage drops below a predetermined fixed value upon arrival of condition at near balance of the opposing voltages, the coil of the sensitive null detecting relay 55 becomes deenergized and its contacts 54 open. This causes the coil of the solenoid 83 to be deenergized and return spring 88 pivots the gear plate 77 counterclockwise as viewed in FIG. VII into a position such that high speed friction wheel 86 no longer contacts and drives friction wheel 87 and low speed friction wheel 90 contacts and drives friction wheel 87. In such position, the drive is in low speed to reject random acceleration loads, i.e., the speed of the indicating mechanism is so low that, when appropriate balance is attained, movements if any of the indicator 15b are not significant and the correct dead weight of an erratically moving load is indicated.

When the load is removed from the scale, the bridge network again is unbalanced until the servomotor 14b returns the sliding contact of the potentiometer 10b to its zero position. Unbalance of the network causes the sensitive relay 55 to be reenergized to close its contacts 54. Closing of the contacts 54 permits the solenoid 83 to be energized automatically shifting the drive into high speed to rapidly return the indicator 15b toward its zero position.

The embodiments of the invention herein shown and described are to be regarded as illustrative only, and it is to be understood that the invention is susceptible to variation, modification, and change within the spirit and scope of the subjoined claims.

This is a continuation-in-part of U.S. application Serial No. 601,255 filed on July 31, 1956, now abandoned in the name of R. J. Maring.

Having described the invention, I claim:

1. A weighing scale comprising, in combination, a network having an output voltage which is a function of load applied to the weighing scale, a continuously automatically adjustable voltage source that supplies a second voltage in opposition to the output voltage of the network, servo means for adjusting the voltage source in a balancing direction in response to differences between the voltages, load indicating mechanism for indicating the output voltage of the voltage source in terms of weight, a drive which connects the servo means to the adjustable voltage source and to the load indicating mechanism, and means for changing the speed ratio of the drive in response to arrival of condition at near balance of the opposing voltages.

2. A weighing scale according to claim 1 wherein said means for changing the speed ratio of the drive in response to arrival of condition at near balance of the opposing voltages changes the speed ratio in response to arrival of the opposing voltages at a predetermined level of unbalance.

3. A weighing scale according to claim 1 wherein said means for changing the speed ratio of the drive in response to arrival of condition at near balance of the opposing voltages changes the speed ratio in response to reversal of direction of the servo means.

4. In a weighing scale for indicating the true weight of a load moving erratically upon the scale, in combination, a network having an output voltage which is a function of load applied to the weighing scale, a continuously automatically adjustable voltage source that supplies a second voltage in opposition to the output voltage of the network, servo means for adjusting the voltage source in a balancing direction in response to differences between the voltages, load indicating mechanism for indicating the output voltage of the voltage source in terms of weight, an adjustable drive means which connects the servo means to the adjustable voltage source and to the load indicating mechanism and which is adapted to be driven normally at a relatively high speed by the servo means, and speed reducing means for adjusting said drive means for reducing said high speed on arrival of condition at near balance of the opposing voltages.

5. Apparatus according to claim 4 wherein the speed reducing means reduces the speed ratio in response to arrival of the opposing voltages at a predetermined level of unbalance.

6. Apparatus according to claim 4 wherein the speed reducing means changes the speed ratio in response to reversal of direction of the servo means.

7. An instrument comprising, in combination, a source of output voltage to be measured, means for supplying a balancing voltage in opposition to the output voltage, servo means for adjusting said means in a balancing direction in response to differences between the voltages, indicating mechanism for indicating the balancing voltage, a drive which connects the servo means to the means for supplying the balancing voltage and to the indicating mechanism, and means for changing the speed ratio of the drive in response to arrival of condition at near balance of the opposing voltages.

8. An instrument for measuring a variable comprising, in combination, a transducer having an output voltage which is a function of the variable, means for supplying a balancing voltage in opposition to the output voltage of the transducer, servo means for adjusting said means in a balancing direction in response to differences between the voltages, indicating mechanism for indicating the balancing voltage in terms of the variable, an adjustable drive means which connects the servo means to the means for supplying the balancing voltage and to the indicating mechanism and which is adapted to be driven normally at a relatively high speed by the servo means, and speed reducing means for adjusting said drive means for changing said high speed on arrival of condition at near balance of the opposing voltages.

9. An instrument for measuring a variable comprising, in combination, a transducer having an output voltage which is a function of the variable, means for supplying a balancing voltage in opposition to the output voltage of the transducer, servo means for adjusting said means in a balancing direction in response to differences between the voltages, indicating mechanism for indicating the balancing voltage in terms of the variable, a drive which connects the servo means to the means for supplying the balancing voltage and to the indicating mechanism, the drive including a driven friction wheel operatively connected to the means for supplying the balancing voltage and to the indicating mechanism, a slow speed driving friction wheel, a high speed driving friction wheel, the driving wheels being mounted to pivot about a common axis which is an axis other than either one of the axes of rotation of the driving wheels, and gearing so connecting the servo means to the driving friction wheels that the slow speed friction wheel is operated at a speed substantially less than that of the high speed friction wheel, and means for pivoting one or the other of the driving friction wheels into driving contact with the driven friction wheel in response to arrival of the opposing voltages at a predetermined level of unbalance to change the speed ratio of the drive.

10. An instrument for measuring a variable comprising, in combination, a transducer having an output voltage which is a function of the variable, means for supplying a balancing voltage in opposition to the output voltage of the transducer, servo means for adjusting said means in a balancing direction in response to differences between the voltages, indicating mechanism for indicating the balancing voltage in terms of the variable, a drive which connects the servo means to the means for supplying the balancing voltage and to the indicating mechanism and which is adapted to be driven normally at a relatively high speed by the servo means, the drive including a driven friction wheel operatively connected to the means for supplying the balancing voltage and to the indicating mechanism, a slow speed driving friction wheel, a high speed driving friction wheel, the driving wheels being mounted to pivot about a common axis which is an axis other than either one of the axes of rotation of the driving wheels, and gearing so connecting the servo means to the driving friction wheels that the slow speed friction wheel is operated at a speed substantially less than that of the high speed friction wheel, and means for pivoting the high speed driving wheel out of frictional engagement with the driven friction wheel and the slow speed driving wheel into such frictional engagement with the driven friction wheel for reducing said normal high speed on arrival of condition at near balance of the opposing voltages.

11. A weighing scale comprising, in combination, a network having an output voltage which is a function of load applied to the weighing scale, a continuously automatically adjustable voltage source that supplies a second voltage in opposition to the output voltage of the network, servo means for adjusting the voltage source in a balancing direction in response to differences between the voltages, load indicating mechanism for indicating the output voltage of the voltage source in terms of weight, a drive which connects the servo means to the adjustable voltage source and to the indicating mechanism, the drive including a driven friction wheel operatively connected to the adjustable voltage source and to the indicating mechanism, a slow speed driving friction wheel, a high speed driving friction wheel, the driving wheels being mounted to pivot about a common axis, and gearing so connecting the servo means to the driving wheels that the slow speed friction wheel is operated at a speed substantially less than that of the high speed friction wheel, and means for pivoting one or the other of the driving friction wheels into driving contact with the driven friction wheel in response to arrival of the opposing voltages at a predetermined level of unbalance to change the speed ratio of the drive.

12. In a weighing scale for indicating the true weight of a load moving erratically upon the scale, in combination, a network having an output voltage which is a function of load applied to the weighing scale, a continuously automatically adjustable voltage source that supplies a second voltage in opposition to the output voltage of the network, servo means for adjusting the voltage source in a balancing direction in response to differences between the voltages, load indicating mechanism for indicating the output voltage of the voltage source in terms of weight, a drive which connects the servo means to the adjustable voltage source and to the indicating mechanism which is adapted to be driven normally at a relatively high speed by the servo means, the drive including a driven friction wheel operatively connected to the adjustable voltage source and to the indicating mechanism, a slow speed driving friction wheel, a high speed driving friction wheel, the driving wheels being mounted to pivot about a common axis, and gearing so connecting the servo means to the driving wheels that the slow speed friction wheel is operated at a speed substantially less than that of the high speed friction wheel, and means for pivoting the high speed driving wheel out of frictional engagement with the driven friction wheel and the slow speed driving wheel into such frictional engagement with the driven friction wheel for reducing said normal high speed on arrival of condition at near balance of the opposing voltages.

References Cited in the file of this patent

UNITED STATES PATENTS

| | | |
|---|---|---|
| 1,668,073 | Hebden | May 1, 1928 |
| 1,765,495 | McKim | June 24, 1930 |
| 2,004,034 | Cadiet | June 4, 1935 |
| 2,678,206 | Muldoon | May 11, 1954 |
| 2,914,310 | Bahrs | Nov. 24, 1959 |
| 2,919,123 | Spademan | Dec. 29, 1959 |
| 2,948,523 | Allen | Aug. 9, 1960 |